Oct. 14, 1969 C. BABILLON 3,473,125

KLYSTRON AM TRANSMITTERS

Original Filed Dec. 1, 1964 4 Sheets-Sheet 1

United States Patent Office 3,473,125
Patented Oct. 14, 1969

3,473,125
KLYSTRON AM TRANSMITTERS

Claude Babillon, Paris, France, assignor to CSF-Compagnie Generale de Telegraphie Sans Fil, a corporation of France Continuation of application Ser. No. 414,968, Dec. 1, 1964. This application Dec. 19, 1967, Ser. No. 694,962
Int. Cl. H04b *1/04*
U.S. Cl. 325—120 4 Claims

ABSTRACT OF THE DISCLOSURE

A multiple cavity klystron AM transmitter having a signal input connected to parallel amplifiers, one being linear and the other being non-linear. An exciter stage is connected between the linear amplifier and the input to the klystron and the non-linear amplifier is connected to the klystron modulation anode. The non-linear amplifier passes only the positive signals thereby reducing current consumption and a negative feedback loop connects the output of the klystron through a detector to the input of the linear amplifier for retaining, in the low frequency band to be transmitted, suitable phase between the klystron modulation signal and the modulation of the exciter stage.

This application is a continuation of the application Ser. No. 414,968, filed Dec. 1, 1964, now abandoned.

The present invention relates to multiple cavity klystron AM transmitters. It has for its object to provide an improved transmitter of this type, wherein, by means of a double modulation, which does not raise difficulties as to the phase relations to be maintained, it is possible to avoid both the poor efficiency of the klystron operated as a constant intensity beam amplifier for an AM wave, and the drawbacks inherent to its use as a modulated amplifier for a sinusoidal oscillation at the transmitting frequency.

According to the invention, there is provided an amplitude modulation transmitter comprising: a general input for receiving the signals carrying the information to be transmitted; a first and a second amplifier having respective inputs coupled to the general input, said first amplifier being a linear amplifier and said second amplifier being a non linear amplifier amplifying only the crests, above a predetermined level, of the input signal; an os-
FIG. 4 shows one embodiment of an ultra high frequency; amplitude-modulating means having a carrier input coupled to said oscillator and a modulation input coupled to the output of said first amplifier; a multiple cavity klystron having a radio frequency input coupled to the output of said amplitude modulating means and a beam intensity modulating electrode coupled to the output of said second amplifier; and an envelope negative feed back path coupling the output of said klystron to the input of a stage of said linear amplifier.

The invention and its advantages will be better understood and other characteristics will become apparent from the following description and accompanying drawings, in which.

A preliminary description will be given by means of FIG. 1 of an amplitude modulation arrangement for a multiple cavity klystron, this klystron receiving a high frequency signal consisting of a pure sinusoidal oscillation.

Figure 1:
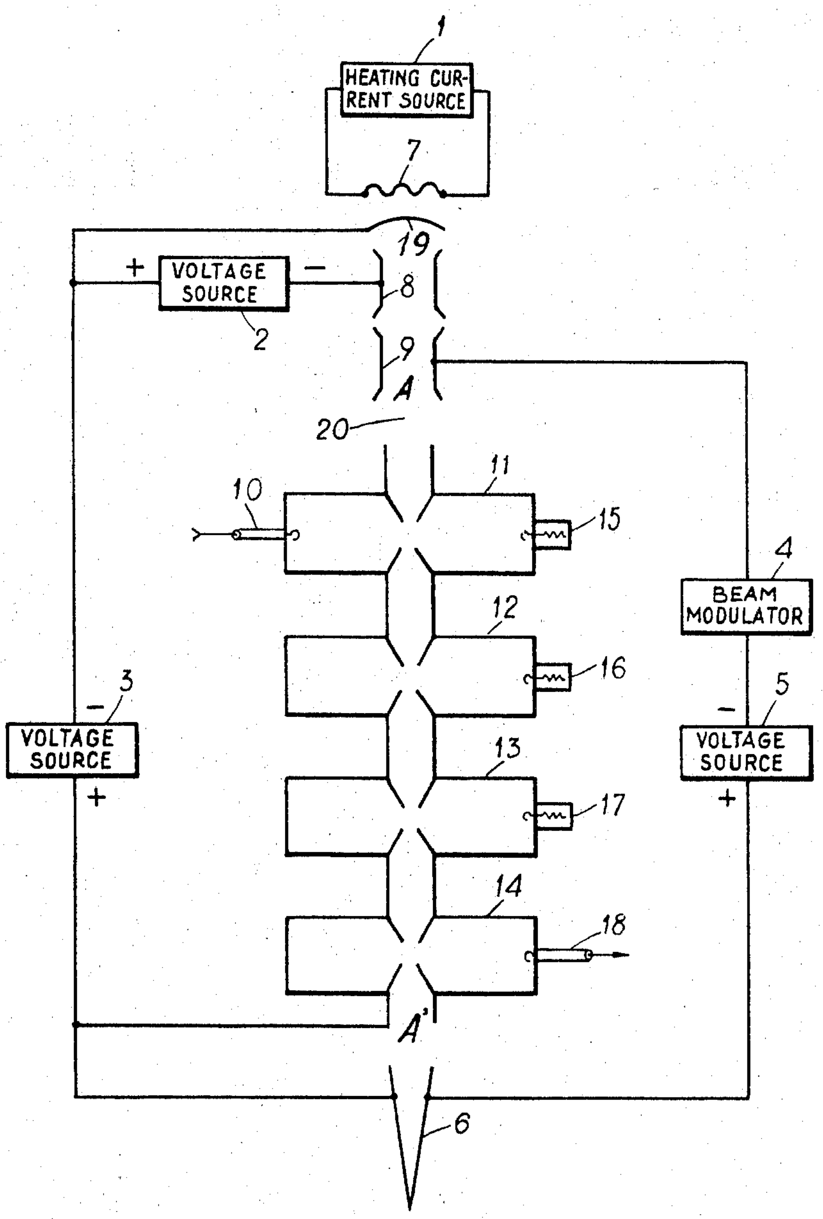
FIG. 1 is a diagram of a circuit for amplitude modulating the beam current of a multiple cavity klystron.

FIG. 1 shows schematically a multiple cavity klystron 20, for example of F2008 type. The diagram shows only these elements which are necessary for a proper understanding of the invention; for example, the envelope which maintains the arrangement in a high vacuum is omitted.

A cathode is heated by a filament 7 supplied from a supply source 1. The klystron also comprises a control electrode 8 and an electrode 9, generally known as modulation anode.

The path of the beam further comprises a duct A–A′ which passes through four successive cavities 11 to 14, the first three of which may include damping arrangements 15 to 17.

The first cavity 11 has an input 10 to which the klystron high-frequency input signals is applied.

The last cavity 14 possesses an output 18 which is the klystron output.

The collector is shown at 6.

A power supply 3, with its negative pole connected to cathode 19, and with its positive pole connected to the output of duct A–A′ and to collector 6 is the high voltage supply of the klystron.

An auxiliary source 2, with its positive pole connected to the negative pole of source 3 and with its negative pole connected to the control electrode 8, applies to the latter a bias which is negative with respect to cathode 19.

A bias source 5 has its positive pole connected to collector 6 and to the positive pole of source 3, and has its negative pole connected to a modulator 4, whose output is connected, to anode 9.

Except for the supply source of the modulation anode, this circuit is the conventional circuit of a klystron amplifier for high-frequency amplitude modulated signals. In this latter circuit the modulation anode is connected to the positive pole of source 3 through a simple resistance. The high-frequency amplitude modulated signal is applied to input 10, and the amplified signal is collected at output 18.

In order to explain the poor efficiency of the klystron used as an amplifier with a constant intensity beam, the case of a sound transmitter modulated in amplitude at 100% maximum depth of modulation will be considered by way of example.

If the klystron is used in this way, it operates as a class A amplifier, with a constant collector current $Ic$, for all input signal levels. Calling $Vc$ the voltage of source 3, the power applied to the klystron is $Vc.Ic$, and the ratio of the output power to the power applied to the beam if it is, for example, 40% for the peak output power, drops to 10% for the carrier power. Since the mean statistical depth of modulation is evaluated at 30%, the mean transmitted power is little different from the carrier power and efficiency is very poor.

Using the klystron as a modulated amplifier, with the modulation applied to the modulation anode in order to vary the beam intensity as a function of the low-frequency modulating signal, permits varying the applied power with the level of the transmitted modulating signal, so improving the efficiency.

In the circuit diagram of FIG. 1, a high-frequency signal is applied to input 10, this signal consisting of a pure sinusoidal oscillation whose amplitude is so chosen that saturation of the output power is reached at peaks of the signal applied to the modulation anode.

Figure 2:
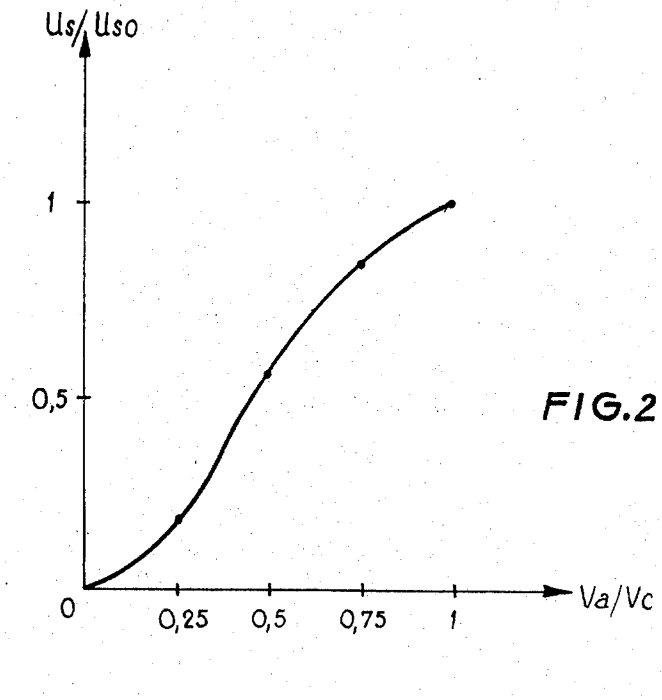

Under these conditions the tube's modulation characteristic has the general shape shown in FIG. 2, where the abscissae are the ratio $Va/Vc$, the ordinates being the ratio $Us/Uso{:}Vc$ is the voltage of source 3; $Va$ is the potential difference between the modulation anode 9 and cathode 19; $Va=Vc-Vp+Vm$, where V$m$ is the voltage supplied by element 4, and V$c$ and C$p$ are the absolute values of the voltages supplied by sources 3 and 5 respectively; U$s$ is the output amplitude, and U$so$ is the peak output amplitude.

The carrier amplitude in the present example corresponds to $Us/Uso=0.5$.

Figure 3:
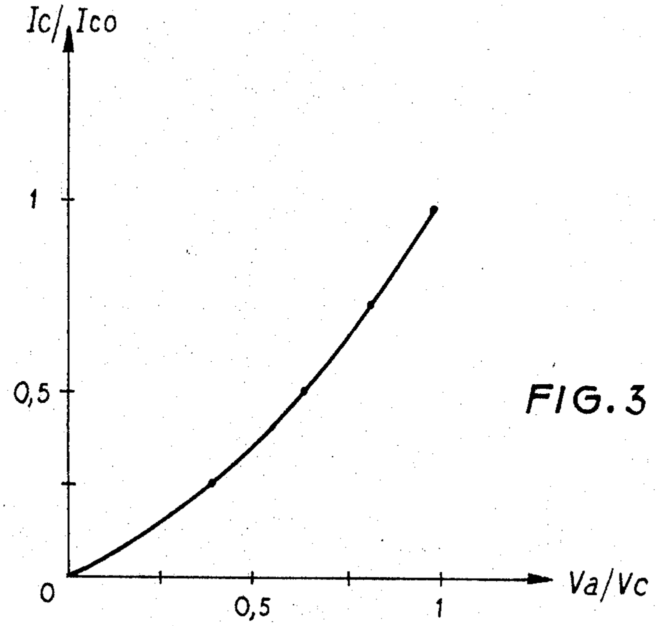
FIGS. 2 and 3 are characteristic curves which show the mode of operation of the circuit of FIG. 1.

The modulation anode voltage V$a$ corresponding to the carrier is about 0.5 times the voltage V$c$. For this voltage, the beam current I$c$ is approximately equal to 0.35 times the maximum current, as can be seen from the curve of FIG. 3 where the abscissae are the ratio $Va/Vc$ and the ordinates are the ratio $Ic/Ico$, I$co$ being the collector current obtained at $Va/Vc=1$. This curve corresponds approximately to the function $$Ic/Ico=Va^{3/2}/Vc$$

In this way power consumption has been cut down by more than one half, the modulation anode current being negligible.

But, as can be seen from FIG. 2, the modulation characteristic is not linear; basically, it is possible to overcome this defect by applying an overall envelope negative feed-back (not shown) coupling the klystron output 18 to the input of circuit 4.

The difficulty arises from the fact that the modulation voltage $Vm=Va+Vp-Vc$ has to be supplied at very high level; for V$a$ has to vary from zero to V$c$, and so V$m$ has to vary from $Vp-Vc$ to V$p$, hence over an interval of V$c$ of the order of 15 to 20 kilovolts. This raises the problem of obtaining the required modulation voltage with no large phase shift which would complicate the application of the overall negative feed-back. This is due to the fact that the load impedance is high, the modulation anode current being very low (about one milliampere) and the effect of stray capacities being marked (unless the modulator 4 is loaded on a low resistance; this, leading to a high-low frequency power which lowers the overall efficiency); this solution is therefore not satisfactory.

Figure 4:
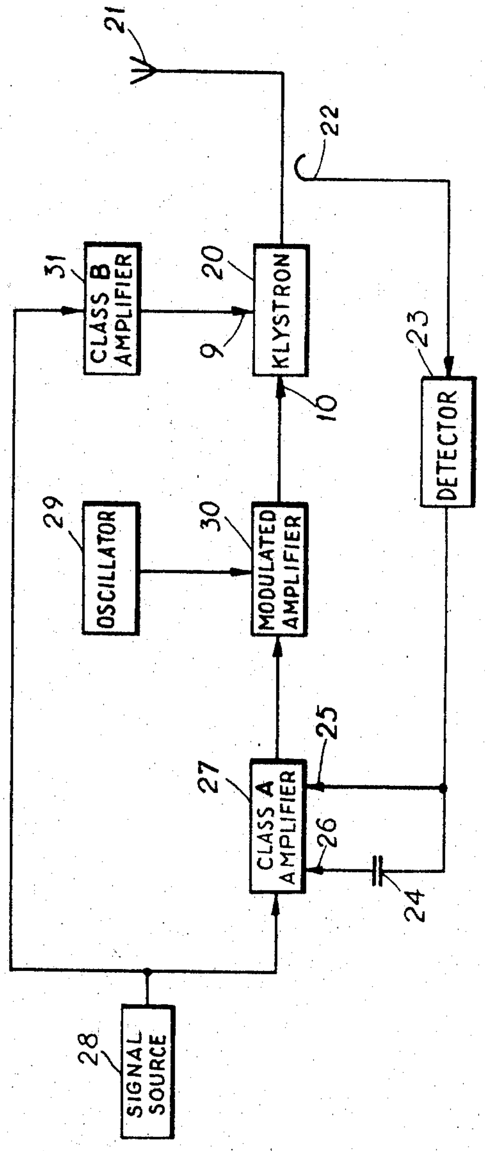
FIG. 4 shows one embodiment of an ultra high frequency transmitter using a multiple cavity klystron wherein klystron current modulation is superimposed on the modulation of the input UHF signal.

FIG. 4 is the diagram of a klystron transmitter according to the invention.

This circuit comprises klystron 20 of FIG. 1, with a radio-frequency input 10 and modulation anode 9. The output of klystron 20 is coupled to an antenna 21.

Circuit 28 which delivers the low-frequency signal to be transmitted feeds in parallel amplifiers 27 and 31, the former being a class A amplifier and the latter a class B. The output of amplifier 31 is connected to the klystron modulation anode 9, which is biased by a source not shown. The other D.C. supplies of klystron 20 are likewise not shown but can be seen in FIG. 1.

A high-frequency oscillator 29 has its output connected to one of the inputs of a conventional modulated amplifier 30, which may be grid-, cathode- or anode-modulated and whose modulation input is connected to the output of amplifier 27.

The output of modulated amplifier 30 is connected to the RF input 10 of klystron 20.

Thus the oscillation supplied by oscillator 29 is amplitude modulated by the whole of the low-frequency signal in modulated amplifier 30, and is then applied to the RF input of the klystron.

Amplifier 31 passes only the positive parts of the signal, the resting voltage of the anode is adjusted to be adequate for the carrier power. Power consumption will therefore be reduced by about one half, as in the case of FIG. 1.

Since only the positive parts of the signal to be transmitted are applied to the modulation anode, the modulation voltage has to vary only over an interval of the order of $Vc/2$. This facilitates the design of amplifier 31, without adding extra drawback from the point of view of linearity.

Figure 5:
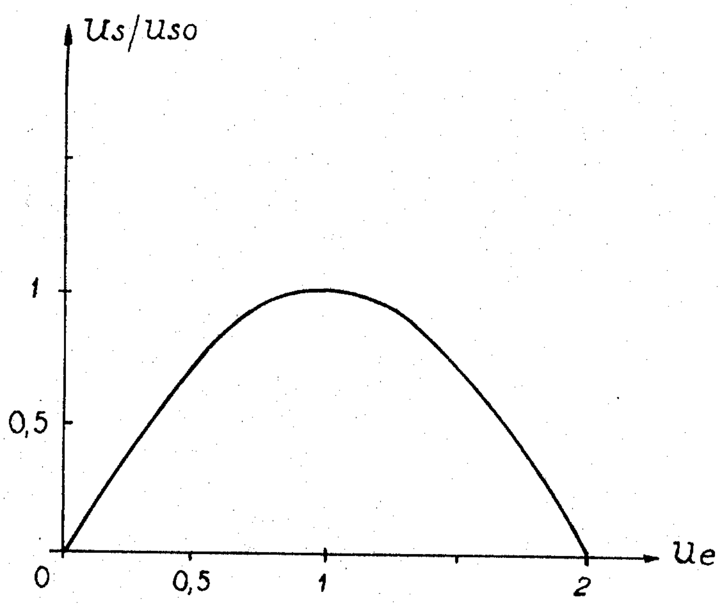
FIGS. 5 and 6 show characteristic curves which explain the mode of operation of the transmitter of FIG. 4.
Figure 6:
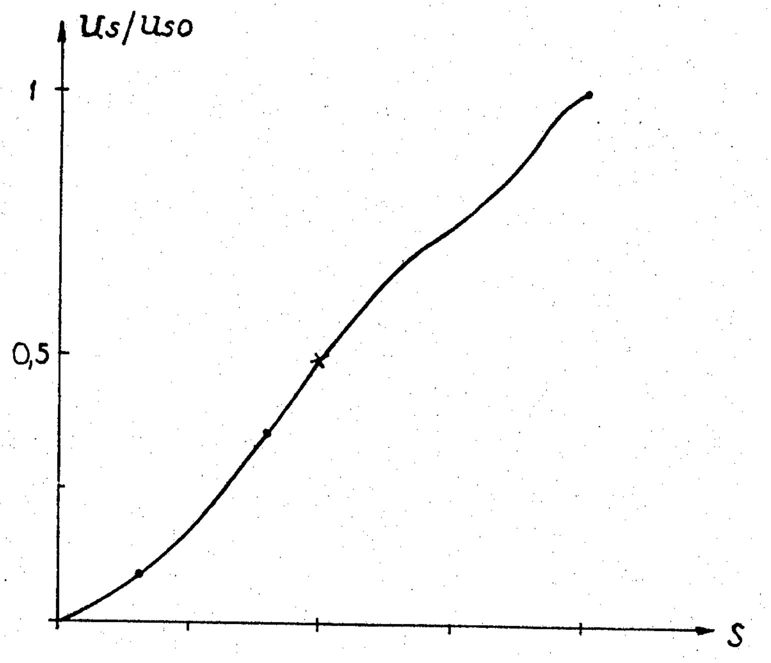

This is due to the fact that in the absence of modulation on anode 9, the amplitude response of the klystron is relatively linear, as long as the amplitude of its RF input signal remains under a certain level as shown in FIG. 5, where the abscissae are the amplitude U$e$ of the input UHF signal and the ordinates are the ratio $Us/Uso$ defined above. But, at the peaks, the klystron tends to compress the modulation. Since modulation is applied simultaneously on two stages at the peaks, some compensation is secured. The overall modulation characteristic has the shape shown in FIG. 6, where the abscissae are the low-frequency signal S supplied by circuit 28, and the ordinates are the ratio $Us/Uso$.

So this improvement essentially reduces the klystron modulation voltage with no loss either in efficiency or in linearity.

However, envelope negative feed-back is always essential in order to secure desirable quality, and further difficulties might arise on account of the high load impedance of the klystron modulator.

The above-mentioned improvement is then used; it consists in applying negative feed-back only on the modulation cascade of the high-frequency exciter 29, the latter then giving a high-frequency signal which takes into account defects of klystron linearity since the detected signal applied as negative feed-back at the input of the low-frequency amplifier 27 contains the distortions introduced by the klystron and its modulation.

Applying the negative feed-back only to amplifier 27 simplifies the structure of the transmitter.

FIG. 4 shows this negative feed-back channel starting at probe 22, inserted in the output coaxial cable or waveguide of klystron 20 (coaxial cable or waveguide shown schematically by a wire). This negative feed-back channel is connected to the input of amplifier 27 through a detector 23 and a condenser 24, the latter blocking the DC component.

Since the modulation amplifier 31 is not in the negative feed-back loop, there is no risk of oscillation on account of phase shift.

The purpose of amplifier 31 is only to intensify the klystron beam at the proper time to permit transmission of peak modulation. It is therefore necessary to retain, in the low-frequency band to be transmitted, suitable phase between the klystron modulation signal and the modulation of the exciter stage.

Outside the low-frequency band to be transmitted, however, no conditions are imposed on the phase of amplifier 31, contrary to what occurs if the amplifier is inserted in a negative feed-back loop.

This simplifies the design of this amplifier and allows easy insertion of a transformer which, for example, can separate the low-frequency first stages from the final stage which, for design reasons, can be at klystron cathode potential (e.g. 17 kv.).

An additional improvement consists in applying a DC negative feed-back in order to compensate for carrier level variations with modulation, together with those due to various causes of instability in the remainder of the equipment.

To this end, the output signal from detector 23, taken between the latter and condenser 24, is applied to amplifier 27, for example added to the grid bias of the last stage of this amplifier.

The following performance was obtained on a transmitter designed on these lines:

| | | |
|---|---|---|
| Negative feed-back | db | 28 |
| Harmonic distortion: | | |
| For 94% modulation: | | |
| 40 c./s. | percent | 0.8 |
| 1000 c./s. | do | 0.6 |
| 2500 c./s. | do | 1 |
| 5000 c./s. | do | 0.8 |
| For 50% modulation: | | |
| 10,000 c./s. | percent | 1.4 |
| Residual modulation | db | [1] 69 |
| Carrier variation | percent | $>2$ |

[1] Nonpsophometric.

Pass-band: ±0.5 db from 30 to 10,000 c./s.; attenuation not greater than 2 db at 15,000 c./s.

The case considered was that of a sound transmitter. This application is of course non-restrictive.

In the case of a television transmitter using negative amplitude modulation for the video signal, the arrangement of FIG. 4 will be advantageously modified in the following way:

(a) The complete video modulation (synchronization+vision signal) is applied as usual to the low-power high-frequency exciter stage.

(b) The klystron beam current is reduced, by virtue of the modulation electrode, to a value which allows it to supply only the power corresponding to blanking level, viz: 0.56 of peak power. In this way power consumption is reduced to about 0.7 times normal consumption.

(c) The synchronizing pulses are applied at appropriate amplitude (about 0.2 times V*c*) to the modulation electrode so as to intensify the klystron beam sufficiently at the instant of the synchronizing pulse to ensure that peak power is obtained.

The statistical mean anode efficiency of the klystron which, for the picture, is normally 15% when the klystron is used as an amplifier, can thus reach about 20%.

It should be noted that synchronizing pulse modulation is possible on the klystron since the necessary pass-band is only about 1.5 mc./s. and the voltage only 3 to 4 kilovolts. But modulation on the anode of the klystron by a complete signal would meet with bandwidth difficulties (6 to 10 mc./s.) on account of the necessary voltage V*c*, and also with difficulties of spurious phase modulation and variation of pass-band with the mean level of the video modulation.

The invention is of course not restricted to the modes of realization described and illustrated.

That which is claimed is:

1. An amplitude modulation transmitter comprising: an input for receiving the signals carrying information to be transmitted; a first and a second amplifier having respective inputs coupled to said input for receiving the whole of the frequency spectrum of said information and respective outputs, said first amplifier being a linear amplifier and said second amplifier being a non-linear amplifier for amplifying only the crests, above a predetermined level, of its input signal; an oscillator for supplying an oscillation at the transmitting frequency; amplitude-modulating means having a carrier input coupled to said oscillator and a modulation input coupled to the output of said first amplifier; a multiple cavity klystron having a radio frequency input coupled to the output of said amplitude-modulating means, a beam intensity modulating electrode coupled to the output of said second amplifier, an envelope negative feed-back path including a probe means for coupling the output of said klystron to a detector means and said detector means connected to the input of said linear amplifier.

2. A transmitter as claimed in claim 1, wherein, said transmitter being a sound transmitter with a maximum percentage modulation equal to 100%, said second amplifier transmits to said beam intensity modulating electrode only the positive portions of the information carrying signals.

3. A transmitter as claimed in claim 1, wherein, said transmitter being a television image transmitter, said second amplifier transmits to said beams intensity modulating electrode only the crests, corresponding to the synchronizing pulses, of the information carrying video-frequency signal.

4. A transmitter as claimed in claim 1, wherein, said detector means have a further output to provide a D.C. bias for said linear amplifier.

References Cited

UNITED STATES PATENTS

| | | | |
|---|---|---|---|
| 2,172,453 | 9/1939 | Rose. | |
| 2,617,979 | 11/1952 | Hutton | 332—7 |
| 2,881,394 | 4/1959 | Ernyei | 332—41 |

FOREIGN PATENTS

| | | |
|---|---|---|
| 115,644 | 8/1942 | Australia. |

ROBERT L. GRIFFIN, Primary Examiner

ALBERT J. MAYER, Assistant Examiner

U.S. Cl. X.R.

332—7, 41, 370